May 21, 1963  V. C. GRAY  3,090,461
ELECTRICAL SOUND REPRODUCING DEVICES
Filed Aug. 14, 1957  2 Sheets-Sheet 1
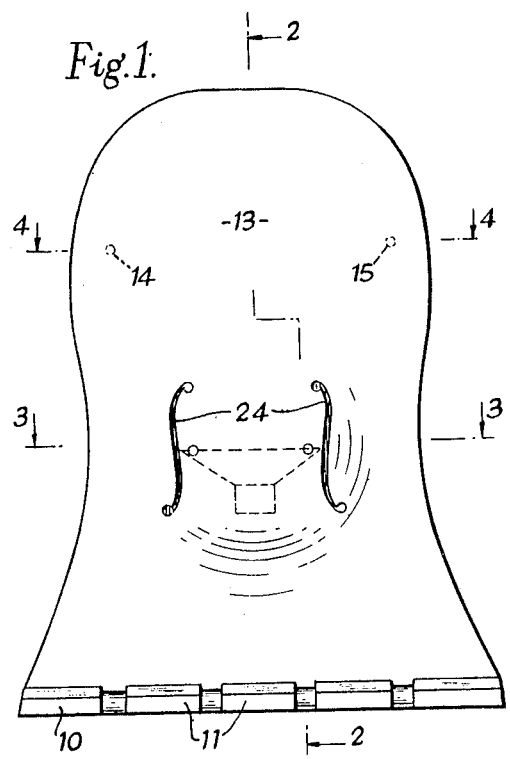
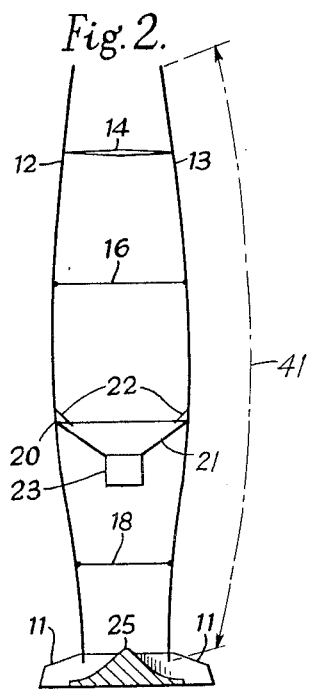
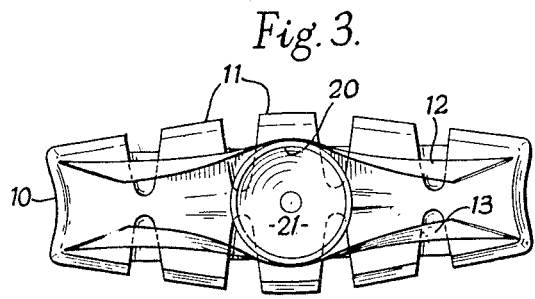
INVENTOR.
Vivian C. Gray
BY
Paul B. Hunter
Attorney May 21, 1963
V. C. GRAY
3,090,461
ELECTRICAL SOUND REPRODUCING DEVICES
Filed Aug. 14, 1957
2 Sheets-Sheet 2
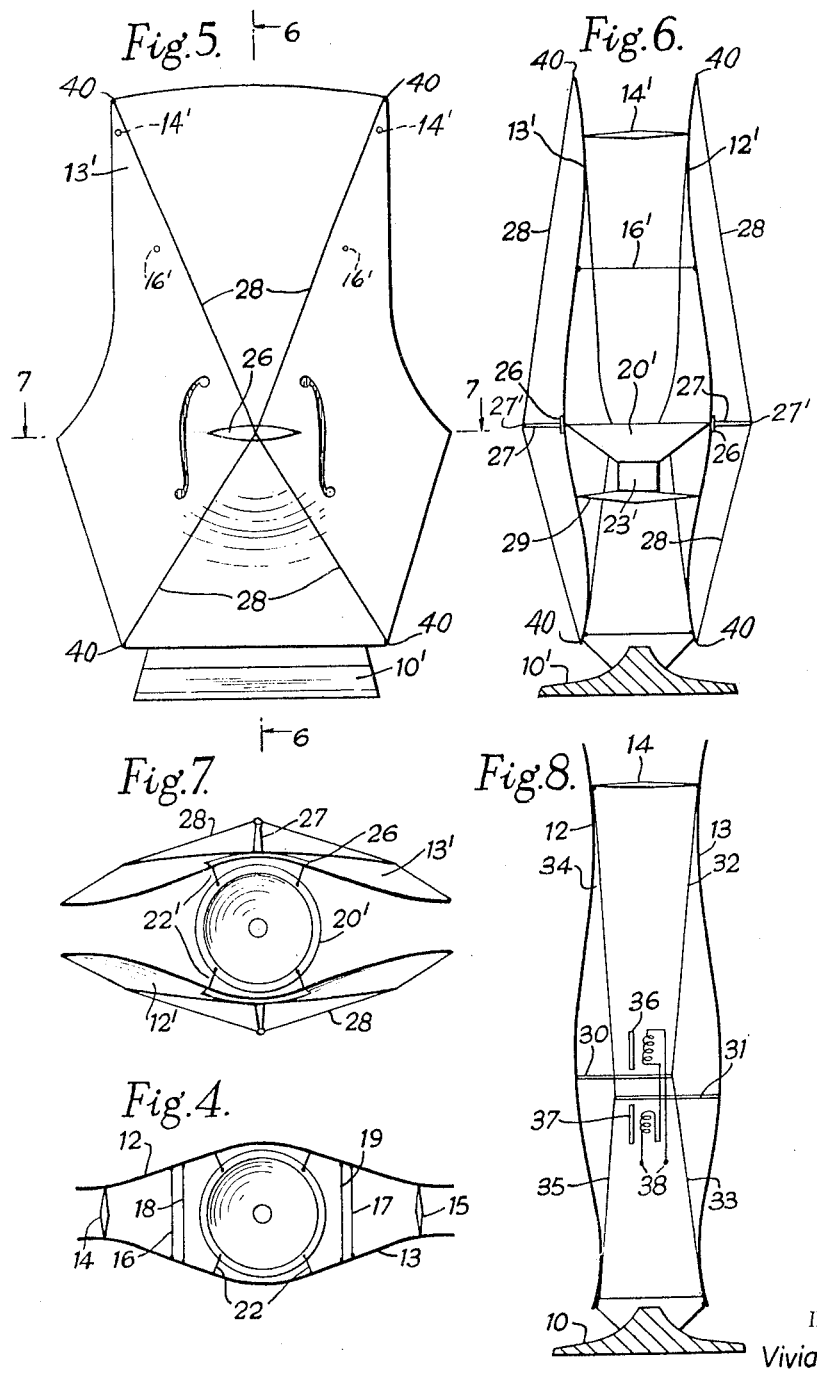
INVENTOR.
Vivian C. Gray
BY
Paul B. Hunter
Attorney 3,090,461
ELECTRICAL SOUND REPRODUCING DEVICES
Vivian C. Gray, 49 Brighton Road, Crawley, England
Filed Aug. 14, 1957, Ser. No. 678,157
Claims priority, application Great Britain Aug. 20, 1956
3 Claims. (Cl. 181—31)

The present invention relates to electrical sound reproducing devices and has for its principal object to provide an improved device of this kind which is not only efficient in operation but, also, can be made of attractive appearance.

According to the present invention there is provided an electrical sound reproducing device comprising two generally parallel walls of thin resilient material spaced apart by a distance less than their superficial dimensions, and between the walls electrically operated means for setting the walls in vibration.

The electrically operated means may comprise an electromagnetically operated cone-shaped diaphragm disposed with its axis approximately parallel to the walls and setting the walls in vibration by acoustic coupling.

Alternatively the electrically operated means may comprise an electro-magnetic device having one or more electro-magnetically driven vibratable members connected to the walls and arranged to drive the walls in opposite directions.

An important subsidiary feature of the invention is the provision of struts and ties extending between the walls. By suitably selecting the positions of such struts and ties the quality of sound reproduction can be adjusted to suit taste and the effects of the room in which the device is used.

The invention will be described, by way of example, with reference to the accompanying drawings in which:

FIG. 1 is a view of one embodiment of the invention in front elevation,

FIG. 2 is a somewhat diagrammatic view in section on the line 2—2 of FIG. 1,

FIG. 3 is a sectional plan view on the line 3—3 of FIG. 1,

FIG. 4 is a diagrammatic sectional plan view on the line 4—4 of FIG. 1, with the base omitted, FIG. 5 is a view in front elevation of another embodiment of the invention, FIG. 6 is a somewhat diagrammatic view in section on the line 6—6 of FIG. 5, FIG. 7 is a somewhat diagrammatic view in section on the line 7—7 of FIG. 5, and FIG. 8 is a diagrammatic view in cross-sectional elevation of another embodiment of the invention.

Referring to FIGS. 1 to 4, a base 10, which may be of wood or plastic for example, is formed with projecting fingers 11 which provide spaced supports for mutually spaced portions of the lower edges of two thin, resilient walls 12 and 13, these lower edge portions being fixed to the fingers while the remaining edges of these walls are free to vibrate in use. The walls may be of plywood. The two walls are generally parallel to one another but are given a smoothly curved inflected shape as shown in FIGS. 2 to 4, i.e., having both positive and negative curvature. Two struts 14, 15 are shown fixed between the walls near their upper edges and four taut ties 16, 17, 18 and 19 are fixed, as shown especially in FIGS. 2 and 4, in tension between the walls in positions selected according to the acoustic effects required. Other struts and ties may be used in positions determined empirically.

A frame 20 of an electromagnetically operated cone diaphragm 21 (FIGS. 3 and 4) is suspended by four strings or wires 22 between the two walls about half-way between their bottom and top edges. This diaphragm 21 is driven in well-known manner by a coil fixed thereto arranged in the field of a magnet 23.

The walls may be provided with suitably shaped apertures 24. The central portion 25 of the base 10 may be given the flaring shape shown in FIG. 2 in order to deflect sound through the spaces between the fingers 11. It will be noted that the acoustical reproducing device comprising the spaced walls 12 and 13 is open to the atmosphere around the greater portion of its periphery, thereby providing for the free vibration of the walls except as prestressed, dampened and restrained by struts 14, 15, base 10, and ties 16 to 19, thereby substantially nullifying any natural fundamental or harmonic vibration of these walls other than that caused by diaphragm 21.

In operation, sound generated by the diaphragm 21 is propagated through the space between the walls, emerging through the top, sides and bottom and through the apertures 24. The walls 12 and 13 are also driven in opposite directions (both walls outward together) by acoustic coupling through the air between the walls.

In one example the walls 12 and 13 are about ¼ inch thick, 3 feet 6 inches high and 2 feet 9 inches wide. However, the wall thickness should be as thin as possible consistent with strength. Plywood of about ⅛ inch thickness may be used, for example, and its strength may be increased by soaking in a suitable resin. The superficial dimensions of the walls indicated by the numeral 41 in the drawing must be determined in conjunction with the means for setting the walls in vibration.

In FIGS. 5 to 7, the walls 12' and 13' are mounted on a base 10'; as in FIGS. 1 to 4, the struts 14' and ties 16' may be provided in selected positions. The electro-magnetically driven cone diaphragm unit 20' is suspended by strings or wires 22' as in FIGS. 1 to 4. In the present embodiment, however, a strut 29 is fixed to the magnet 23' and has its ends bearing against, but not fixed to, the walls 12', 13'.

Fixed to the outside of the walls 12' and 13' are relatively stiff members 26 from which project struts 27. Wires or strings 28 extend from the outer ends 27' of these struts to the four corners 40 of the walls. In this description and in the claims four wires or strings are said to extend on each wall.

In FIG. 8 the walls 12 and 13 are shown driven by direct connection to a vibratory motor instead of by acoustic coupling. In FIG. 8 flexible armatures 30 and 31 of magnetic material are fixed at one end to the walls 12 and 13 and their opposite ends are joined by strings or wires 32, 33 and 34, 35 to points at or near the upper and lower edges of the opposite walls. In FIG. 8, each of the four references 32 to 35 represents two strings or wires arranged as in FIG. 5.

Each armature 30, 31 is shown as driven by a separate electromagnet 36 and 37 fixedly supported on the base 10 by means not shown. The electro-magnet windings are connected in series or parallel to terminals 38 to which signals to be reproduced are applied in such a manner that the two walls 12 and 13 are driven in opposite directions.

When signals are applied to the terminals 38, the armatures 30 and 31 flex thereby changing their effective lengths and applying inwardly and outwardly directed forces to the walls, and at the same time they apply forces through the strings or wires to the walls.

I claim:

1. An electrical sound reproducing device comprising two substantially parallel opposed walls of thin resilient material, said walls being smoothly and oppositely curved and of inflected contour and being spaced apart by a distance less than their superficial dimensions to provide an acoustical chamber extending therebetween open substantially throughout its periphery, means supporting said walls over a small portion of their peripheral edges, the greater portion of said peripheral edges being unattached and free to vibrate, strut and tie members extending between said walls at points spaced from said supporting means for prestressing said walls, thereby substantially eliminating spurious vibrations in use, and an electrically operated motion producing means positioned between said walls and supported therefrom for setting the walls in vibration.

2. A device according to claim 1, wherein the electrically operated motion producing means comprises an electro-magnetically operated cone-shaped diaphragm disposed with its axis of revolution extending substantially parallel to said walls and supported therefrom by strings or wires for setting said walls in vibration by acoustic coupling.

3. A device according to claim 1 comprising a strut member projecting centrally from at least one of said walls and one or more tie members such as strings or wires connecting the free end of this strut member to peripheral points on the same wall on either side of said strut member for prestressing said wall.

References Cited in the file of this patent

UNITED STATES PATENTS

| | | |
|---|---|---|
| 1,628,230 | Coburn | May 10, 1927 |
| 1,642,124 | Miller | Sept. 13, 1927 |
| 1,667,251 | Fay et al. | Apr. 24, 1928 |
| 1,763,055 | Hopkins | June 10, 1930 |
| 1,885,308 | Thomas | Nov. 1, 1932 |
| 1,923,870 | Kressmann | Aug. 22, 1933 |
| 2,820,526 | Tavares | Jan. 21, 1958 |

FOREIGN PATENTS

| | | |
|---|---|---|
| 314,889 | Great Britain | July 2, 1929 |
| 433,284 | Italy | Apr. 5, 1948 |